(12) United States Patent
Pisharody et al.

(10) Patent No.: US 11,792,752 B2
(45) Date of Patent: Oct. 17, 2023

(54) SEAMLESS AND RELIABLE CHAIN OF CUSTODY TRANSFER OVER LOW POWER WIRELESS PROTOCOL

(71) Applicant: Intel Corporation, Santa Clara, CA (US)

(72) Inventors: Greeshma Pisharody, Portland, OR (US); Rahul Khanna, Portland, OR (US); Christopher R. Carlson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 17/170,681

(22) Filed: Feb. 8, 2021

(65) Prior Publication Data

US 2021/0410087 A1 Dec. 30, 2021

Related U.S. Application Data

(63) Continuation of application No. 16/460,469, filed on Jul. 2, 2019, now Pat. No. 10,917,865, which is a (Continued)

(51) Int. Cl.
*G08C 17/00* (2006.01)
*H04W 56/00* (2009.01)
(Continued)

(52) U.S. Cl.
CPC .......... *H04W 56/001* (2013.01); *H04W 4/80* (2018.02); *H04W 52/0212* (2013.01); *H04W 84/18* (2013.01)

(58) Field of Classification Search
CPC . H04W 56/001; H04W 4/80; H04W 52/0212; H04W 84/18; Y02D 30/70
(Continued)

(56) References Cited

U.S. PATENT DOCUMENTS 9,215,754 B2 * 12/2015 Ram .................... H04W 74/006
9,538,446 B1 * 1/2017 Kaushik ............... H04B 17/318
(Continued)

FOREIGN PATENT DOCUMENTS

CN 103581362 A * 2/2014

OTHER PUBLICATIONS

Hany et al. (Routing over Interconnected Heterogeneous wireless networks and Intermittent connections), 2008, (Year: 2008).*
(Continued)

*Primary Examiner* — Maharishi V Khirodhar
(74) *Attorney, Agent, or Firm* — Schwabe, Williamson & Wyatt, P.C.

(57) ABSTRACT

Apparatuses and methods for providing change and/or transfer of custody signaling in a wireless sensor network (WSN) are disclosed. An apparatus may include communications circuitry to interact with a cloud server to receive an instruction regarding a change of custody for at least one sensor node within a WSN. The at least one sensor node may be assigned to the apparatus for tracking, and the instruction may identify a second apparatus within the WSN to assume custody of the at least one sensor. The apparatus may further include a control unit coupled to the communications circuitry to signal the second apparatus and the at least one sensor node regarding the transfer of custody, wherein the signaling is over a wireless protocol of the WSN. Other embodiments may be described and/or claimed.

21 Claims, 9 Drawing Sheets

Related U.S. Application Data continuation of application No. 15/598,156, filed on May 17, 2017, now Pat. No. 10,362,547.

(51) Int. Cl.
*H04W 52/02* (2009.01)
*H04W 4/80* (2018.01)
*H04W 84/18* (2009.01)

(58) Field of Classification Search
USPC .......................................................... 370/311
See application file for complete search history.

(56) References Cited

U.S. PATENT DOCUMENTS

| | | | |
|---|---|---|---|
| 9,591,066 B1 | 3/2017 | Katyal et al. | |
| 9,860,677 B1 | 1/2018 | Agerstam et al. | |
| 10,362,547 B2* | 7/2019 | Pisharody | H04W 52/0212 |
| 10,917,865 B2* | 2/2021 | Pisharody | H04W 56/001 |
| 2004/0082296 A1* | 4/2004 | Twitchell, Jr. | H04L 12/189 |
| | | | 455/426.2 |
| 2005/0124344 A1* | 6/2005 | Laroia | H04W 36/18 |
| | | | 455/438 |
| 2008/0112373 A1* | 5/2008 | Shpak | H04W 76/11 |
| | | | 370/338 |
| 2009/0160646 A1 | 6/2009 | Mackenzie et al. | |
| 2009/0185505 A1 | 7/2009 | Ripstein et al. | |
| 2009/0264134 A1* | 10/2009 | Xu | H04W 36/32 |
| | | | 455/437 |
| 2011/0032896 A1 | 2/2011 | Cubic et al. | |
| 2012/0224537 A1 | 9/2012 | Bahr et al. | |
| 2014/0029411 A1* | 1/2014 | Nayak | G16H 40/67 |
| | | | 370/219 |
| 2014/0111313 A1* | 4/2014 | Wild | G06K 7/10059 |
| | | | 340/10.42 |
| 2015/0179044 A1 | 6/2015 | Wu et al. | |
| 2016/0133108 A1* | 5/2016 | Bucsa | G08B 17/10 |
| | | | 340/629 |
| 2018/0068266 A1 | 3/2018 | Kirmani et al. | |
| 2018/0124631 A1 | 5/2018 | Ramos de Azevedo | |
| 2018/0324668 A1* | 11/2018 | Taskin | H04W 36/14 |

OTHER PUBLICATIONS

International Search Report and Written Opinion dated Aug. 22, 2018 for International Application No. PCT/US2018/027351; 12 pages.

Alan Mainwaring et al., "Wireless Sensor Networks for Habitat Monitoring", Intel Corporation, pp. 1-11, Jun. 2002; (https://resenv.media.mit.edu/classarchive/MAS965/readings/mainwaring02.pdf).

Chunsheng Zhu et al., "Towards Integration of Wireless Sensor Networks and Cloud Computing", 2015 IEEE 7th International Conference on Cloud Computing Technology and Science (CloudCom), pp. 491-494, Nov. 30, 2015; (https://ieeexplore.ieee.org/document/7396201/).

Carlos Velasquez-Villada et al., "Delay/Disruption Tolerant Network-Based Message Forwarding for a River Pollution Monitoring Wireless Sensor Network Application", Sensors 2016, pp. 1-25, Mar. 25, 2016; (http://www.mdpi.com/1424-8220/16/4/436).

Office Action dated Nov. 14, 2018 for U.S. Appl. No. 15/598,156, 30 pages.

International Preliminary Report on Patentability dated Nov. 28, 2019 for International Patent Application No. PCT/US2018/027351, 8 pages.

Office Action dated Apr. 7, 2020 for U.S. Appl. No. 16/460,469, 42 pages.

Klass Thoelen et al., "Tracking and Tracing Containers through Distributed Sensor Middleware", 2008, 7 pages.

Final Office Action dated Jul. 20, 2020 for U.S. Appl. No. 16/460,469, 25 pages.

* cited by examiner

FIG. 5A

| P.nbr. RX | Time (us) | Length | Frame control field | | | | | Sequence number | Dest. PAN | Dest. Address | Source Address | MAC payload | FCS |
|---|---|---|---|---|---|---|---|---|---|---|---|---|---|
| | | | Type | Sec | Pnd | Ack.req | PAN compr | | | | | | |
| 69970 | +21000224 =427038652 | 29 | Data | 0 | 0 | 0 | 1 | 0xD4 | 0xAABB | 0xFFFF | 0x0201 | AB 00 01 01 02 10 00 00 00 00 00 00 05 01 05 02 11 05 | OK |

FIG. 6

SEAMLESS AND RELIABLE CHAIN OF CUSTODY TRANSFER OVER LOW POWER WIRELESS PROTOCOL

RELATED APPLICATIONS

This application is a continuation of U.S. application Ser. No. 16/460,469 filed Jul. 2, 2019, which is a continuation of U.S. application Ser. No. 15/598,156 filed May 17, 2017, now U.S. Pat. No. 1,036,254, the contents of each of which are hereby incorporated by reference herein in their entireties for all purposes.

TECHNICAL FIELD

Embodiments of the present disclosure generally relate to the field of wireless sensor networks (WSNs), and in particular to chain of custody transfer communications in such wireless sensor networks.

BACKGROUND

Third party logistic companies and retail distributors need an end-to-end solution to monitor the condition and location of assets during all stages of shipment at configurable temporal resolutions. In most logistics and tracking applications, sensors on specific packages need to seamlessly move from one gateway (GW) network in, for example, a warehouse to another mobile GW network, for example, in a truck. Such transfers are generally managed by a cloud server, that communicates to each GW. However, at locations where the cloud might be inaccessible, this poses a problem.

Conventionally, sensor modules equipped with GPS trackers are attached to pieces of cargo, and tracked by a cloud-based system from end-to-end. This may be an expensive and cloud intensive approach, which relies on continual communications between smart tags and one or more cloud servers.

Moreover, it is noted that existing wireless sensor network protocols restrict scalability and demand greater radio activity than is often feasible for dense low-power networks. Further issues arise from the interdependence of software, hardware, and energy. For example, the well-integrated ZigBee® PRO paired with a Contiki operating system has a large and complex software stack, demanding greater memory, processing, and energy from the hardware. While alternatives to 2.4 GHz, such as the LoRa Alliance™ embrace lower carrier frequencies and channel hopping for longer range, they also require larger antenna and lower data rates, as well as existing infrastructure.

Thus, while conventional solutions may suit small-scale consumer needs, they exhibit costly overhead for next-generation, resource-limited, pervasive networks and scalable/dense Internet of Things (IoT).

BRIEF DESCRIPTION OF THE DRAWINGS

FIG. 5A depicts an example association beacon that may be sent out by a new gateway, and example client responses that may be received, in accordance with various embodiments.

FIG. 6 depicts an example beacon that may be sent to advise clients of a change in gateway ID and channel ID as part of a custody handoff of those clients from a current gateway to a new gateway, in accordance with various embodiments.

DETAILED DESCRIPTION

Figure 1:
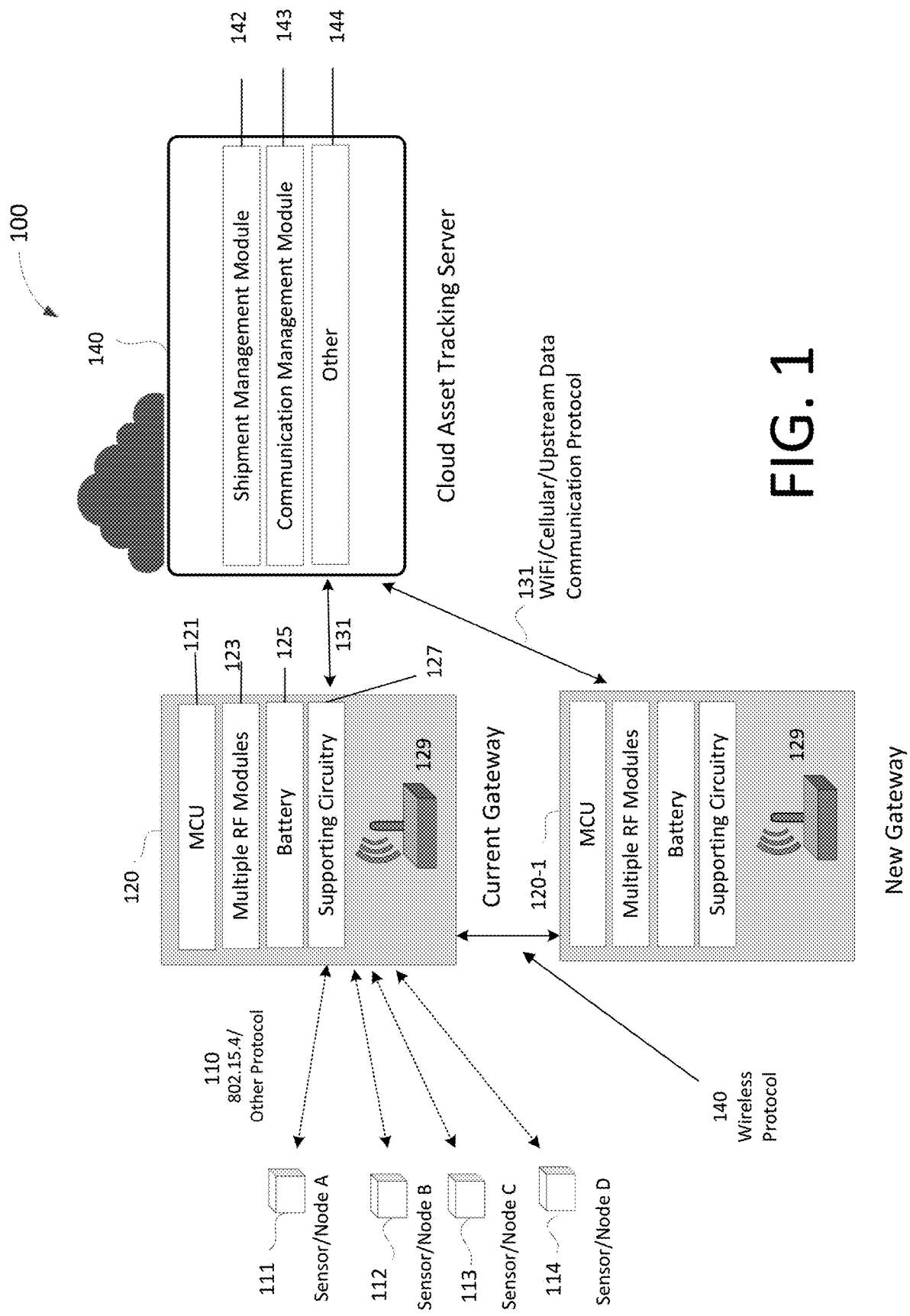
FIG. 1 illustrates an example a system to provide asset tracking and change of custody transfer communications in accordance with various embodiments.

In embodiments, a reliable, optimum and elegant technique to implement a chain of custody transfer of sensors between one gateway (GW) to another within a wireless sensor network (WSN) over a wireless protocol, while the goods to which the sensors are attached or associated with are still in transit or operation, may be provided. In embodiments, the chain of custody transfers may be implemented with minimal to no manual intervention. Thus, various techniques in accordance with embodiments herein allow for gateway to gateway (GW to GW) communication. Such communication may often be more reliable while the cloud might be inaccessible. In embodiments, the chain of custody transfers may be implemented by utilizing the periodic beacons from GWs—that are primarily used for time synchronization of the network—to propagate custody transfer configuration changes to respective sensor nodes.

Additionally, in embodiments, the chain of custody transfers may be performed by ensuring that no sensors/nodes are stranded or unassociated from a GW at any point in time. Techniques according to various embodiments may be implemented in a power optimized manner while still maintaining high reliability and ease of use.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry", including "communications circuitry" or "supporting circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality and/or any combination of software, firmware or hardware. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" as used herein may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the terms "module" "communications module", "communications circuitry" "communications management module," "control module" "control unit," "shipment management module" and/or "multiple RF modules", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality and/or any combination of software, firmware or hardware.

Referring now to FIG. 1, wherein a system for providing transfer of custody communications, as well as monitoring for any "lost" sensors/nodes according to the present disclosure, in accordance with various embodiments, is illustrated. As shown, system 100 may include a gateway 120 provided in a premise, for example a warehouse, a truck, a rail car, rolling stock, an airplane, cargo carrying device or vehicle, or other milieu where goods are prepared for transit to a destination, are in transit, or have reached a destination may be located.

Apparatus 120 may be referred to as a Gateway, as shown. For the purposes of this description, apparatus 120 is designated as the "Current Gateway", i.e., the gateway to which Sensor/Nodes A through D 111-114 are initially assigned. In asset tracking systems, such as may be included in system 100 of FIG. 1, the sensors/nodes are attached to packages or other units of merchandise, and multiple sensors/nodes are assigned to, and are monitored by, gateways. As described below, each of Sensors/Nodes A through D, 111-114 may have various sensors, and may be implemented as what is sometimes known as "smart sensors" or "smart tags." For the purposes of this description, the term "gateway" as used herein includes any device to which a particular sensor/node is assigned, even for a short time, as in what is known as an "intermediary" or gateway "proxy." For example, a warehouse may have various gateways installed, which monitor sensors on packages or pallets of merchandise. When a new shipment comes into the warehouse on a truck, for example, the merchandise in the truck may generally be monitored by, and thus assigned to, a gateway installed on the truck. Once unloaded, it may be that a first portion of the packages in the truck are to be sent onwards to one destination, and a second portion of the packages others to a wholly different one. It may also be that when the truck initially enters the warehouse, the gateways to which each of the first and second portions of packages are to be assigned to for the next leg of their respective journeys may not yet be known, and thus each of the portions may be assigned to a representative or proxy of their actual next gateway, which will subsequently hand them off to the gateway that will monitor them on the next leg of their respective journeys. In some contexts, a sensor may be known as a "child", and the gateway to which it is assigned as its "parent." In a transfer of custody as described below, one or more "children" are advised that they are now in the custody of a new "parent."

Apparatus 120 may be one or more hardware devices and/or one or more software modules and/or any combination of hardware and software that carry out the monitoring and communication with Sensor/Nodes A through D 111-114 in a premise or venue. In embodiments, the one or more hardware devices may be tamper resistant and the operations may be carried out independent of processor(s) of a host/application platform. In embodiments where apparatus 120 is implemented as one or more software modules, the software modules may include "enclaves" which may be isolated regions of code and/or data within the memory of a computing platform.

As seen, in FIG. 1 two Apparatuses 120, 120-1 are shown. Each is a gateway to which are assigned, or may be assigned, several sensor nodes. The description of Apparatus 120 is thus identical for that of Apparatus 120-1.

Apparatus 120 may communicate with a cloud server 140 of system 100, as described below. In embodiments, apparatus 120 may include a Microcontroller Unit (MCU) 121, Multiple RF Modules 123, a Battery 125 and Supporting Circuitry 127. In embodiments, Multiple RF Modules 123 may include WiFi, cellular and Near Field Communication (NFC) modules, and may be implemented in circuitry or communications circuitry of various types. It is noted that MCU 121 may be implemented as a Texas Instruments (TI) CC2630, or the like. Microcontrollers are embedded controllers that perform compute functions at low power and use relatively quicker sleep-wake and wake-sleep timing. In embodiments, MCU 121 may also contain the Media Access Control (MAC) layer of the wireless radio. It is noted that the Media Access Control Layer is one of two sublayers that make up the Data Link Layer of the OSI model. The MAC layer is responsible for moving data packets to and from one Network Interface Card (NIC) to another across a shared channel.

In embodiments, apparatus 120 may communicate with Cloud Server 140 via Upstream Data Communication Protocol 131, which, in embodiments, as shown, may include a WiFi or cellular connection, or other appropriate communications link, and apparatus 120 may communicate with Sensors/Nodes 111-114 over wireless connections, using, for example, the IEEE 802.15.4 protocol, or some equivalent protocol, as the case may be. IEEE 802.15.4 is a technical standard which defines the operation of low-rate wireless personal area networks (LR-WPANs). It specifies the physical layer and media access control for LR-WPANs, and is maintained by the IEEE 802.15 working group, which defined the standard in 2003, and published an updated version in 2006, IEEE 802.15.4-2006 (which superseded the 2003 version).

In embodiments, apparatus 120 may communicate wirelessly, via Multiple RF Modules 123 and modem 129, with Sensors/Nodes A through D 111-114 disposed in its general physical vicinity. As noted above, Sensors/Nodes A through D 111-114 may be smart tags packed inside packages or pallets of merchandise, or attached to them, as the case may be. Each of Sensors/Nodes A through D 111-114 may include a sensor microcontroller unit (MCU), through which it communicates with apparatus 120, and a set of sensors, such as one or more of a humidity/temperature sensor, a 6D accelerometer with tilt, an ambient light sensor, or a pressure sensor. Each of Sensors/Nodes A through D 111-114 may also contain a power source, such as a coin cell battery or the like.

As used herein, and in the claims, sensors assigned to a gateway may be said to be part of that gateway's network. In that sense, a wireless sensor network (WSN) includes many such individual gateways, each with its own "network," where the gateways may communicate with the cloud, and as described herein, with other gateways, and even with the sensors currently assigned to another gateway (as described in connection with FIG. 2 below). Thus, in a larger sense, the WSN is all one large network.

Continuing with reference to FIG. 1, in embodiments, each apparatus 120 may receive information from the cloud, e.g., from Cloud Asset Tracking Server 140, regarding which sensors or smart tags to hand off to another apparatus, such as, for example, informing Current Gateway 120 to hand off custody of some or all of Sensors/Nodes A through D 111-114 to New Gateway 120-1.

Cloud Asset Tracking Server 140 may be one or more hardware devices and/or one or more software modules that carry out the collection of data regarding shipments and individual packages or pallets within those shipments, and the tracking of those shipments via data received from various gateways that report to it. In embodiments, the one or more hardware devices may be tamper resistant and the operations may be carried out independent of processor(s) of a host/application platform. In embodiments where apparatus 140 is implemented as one or more software modules, the software modules may include "enclaves" which may be isolated regions of code and/or data within the memory of a computing platform.

Cloud Asset Tracking Server 140 may include a Shipment Management Module 142, a Communication Management Module 143. Communication Management Module 142 may be one or more software modules that operate in conjunction with one or more hardware devices to configure communications circuitry (not shown) to communicate with one or more apparatuses 120. Cloud Asset Tracking Server 140 may include, or may be expanded to include other module(s), indicated as Other 144 in FIG. 1.

In embodiments, one gateway may communicate with another gateway, such as apparatus 120 with apparatus 120-1 in FIG. 1, over wireless protocol 140, which may be a communications protocol based upon 802.15.4, or any other wireless technology.

Next described are various processes that may be performed by a current gateway and a new gateway, according to various embodiments.

As noted above, in embodiments, a reliable, optimum and elegant technique to implement a chain of custody transfer of sensors between one gateway (GW) to another over a wireless protocol while still in transit or operation, thereby requiring minimal to no manual intervention, may be performed. In embodiments, the periodic beacons from a GW that are primarily used for time synchronization of a network, may be used to propagate custody transfer configuration changes to respective sensor nodes.

Additionally, in embodiments, this may be done effectively by ensuring that no sensors/nodes are stranded or unassociated from a GW at any point in time. In embodiments, these techniques may be implemented in a power optimized manner while still maintaining high reliability and ease of use.

This technique also allows for GW to GW communication which is more reliable while the cloud might be inaccessible. In embodiments, it allows for intelligence to exist more on the edge device rather than relying on the cloud for all custody transfer notifications/decisions.

For instance, in most logistics and tracking applications, sensors on specific packages will need to seamlessly move from, for example, one GW network in a warehouse to another mobile GW network in a truck. At locations where the cloud might be inaccessible, this gives the GWs freedom to make optimum decisions.

Figure 2:
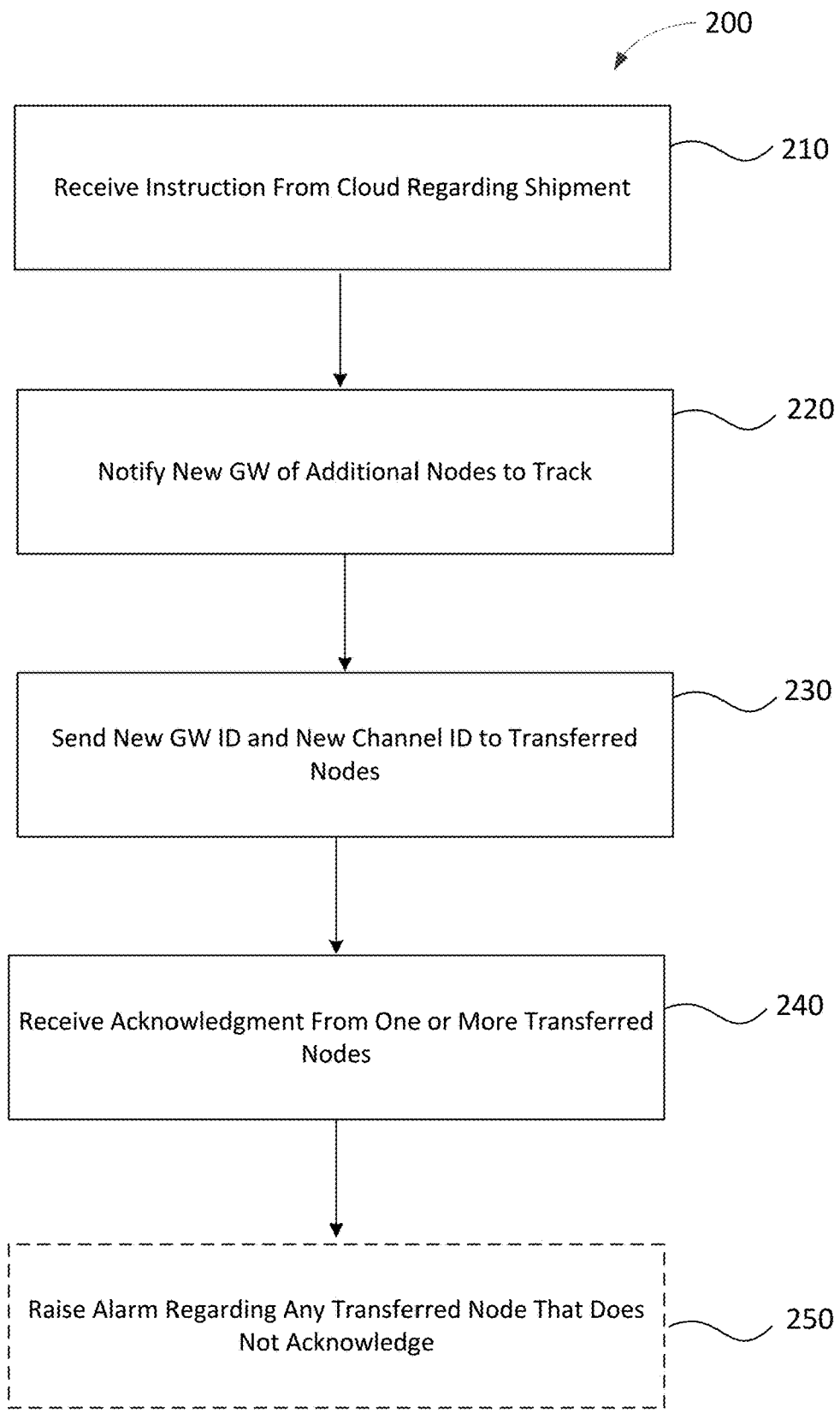
FIG. 2 illustrates an overview of the operational flow of a process for an example process flow for transfer of custody from a current gateway to a new gateway, in accordance with various embodiments.

Referring now to FIG. 2, an overview of operational flow for a process of transfer of custody of a set of nodes from one GW to the other is illustrated. As illustrated, process 200 may include operations performed at blocks 210-250. The operations at blocks 210-250 may be performed by the various elements of apparatus 120, described earlier with reference to FIG. 1.

Process 200 may begin at block 210. At block 210 a current gateway may receive an instruction from the cloud, such as from Cloud Asset Tracking Server 140, regarding one or more packages or pallets in a shipment that the gateway is acting as current gateway for. The instruction may, for example, direct that a subset of the sensors/nodes currently being monitored by the gateway are to be split off of the current shipment and sent to a different destination. That necessitates the smart tags in or on these packages or pallets being placed into the custody of a new gateway in the tracking system, i.e., a transfer of custody from a current gateway to a new gateway.

At block 220 the current gateway may notify the new gateway of additional sensor/nodes to track, which are the very nodes that are being transferred to the custody of the new gateway. In general, it is noted, this notification may be a custom message that may be defined and transmitted over any standard/non-standard network socket.

The notification (from the current gateway) to the new gateway at block 220 allows the new gateway to send out a specific association beacon that allows for the new nodes to join its network, and the new nodes may then respond. In embodiments, the association beacon sent by the new gateway, and the client responses to it, may have the following form:

Association beacon:
AB→ASSOCIATION_BEACON_HEADER_BYTE
0x00→6 bits reserved, 1 bit Calibrate, 1 bit NACK [no calibrate and no NACK in this example]
0x64 0x00→100 max number of clients
0x00→Server beacon time slot to avoid the client from transmitting data while the server is transmitting the beacon
0x01 0x01→101 client ID
0x02 0x01→102 client ID
0x03 0x01→103 client ID
0x04 0x01→104 client ID
Client response—Alive message:
0xBB Alternatively, it is noted, at block 220 the message to the new gateway may come from the cloud.

Figure 5A:
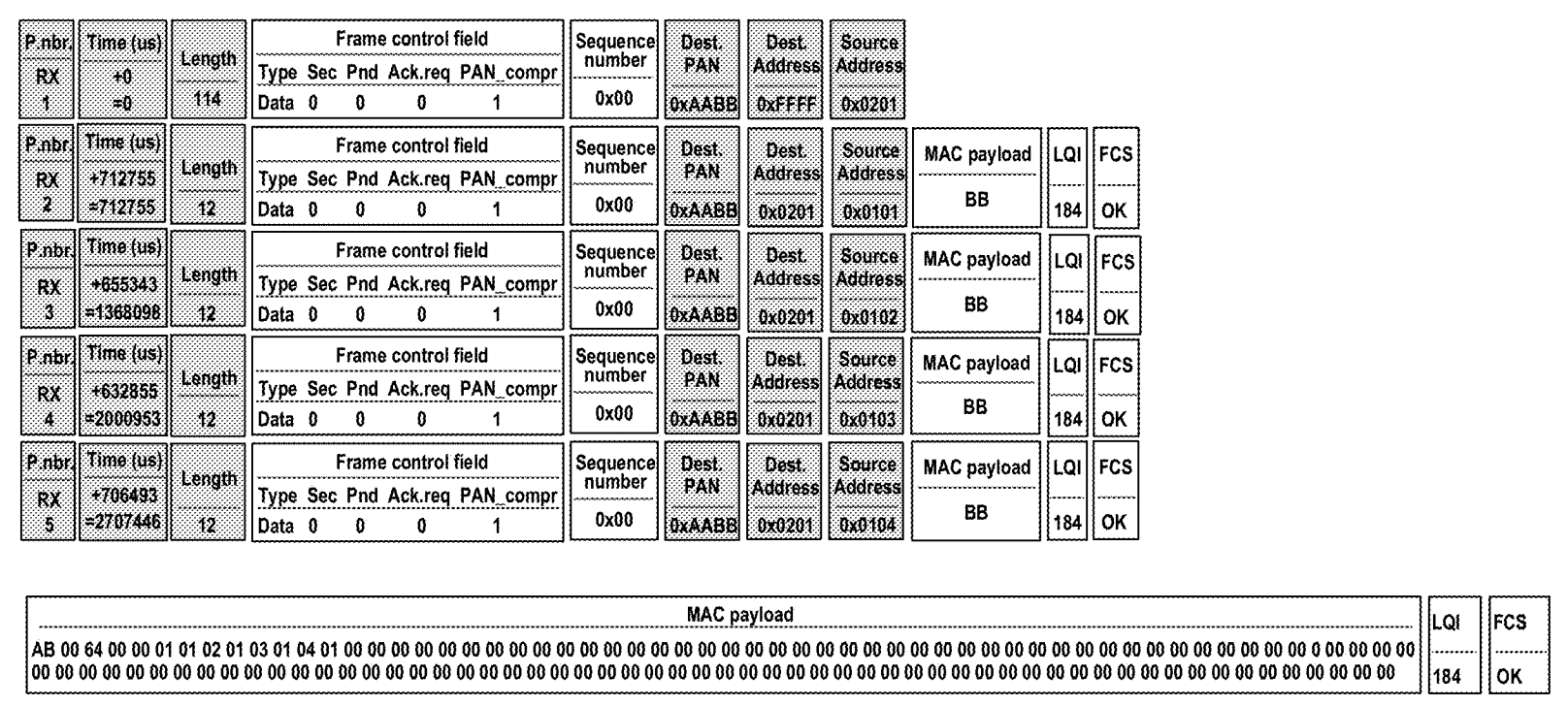
Figure 5B:
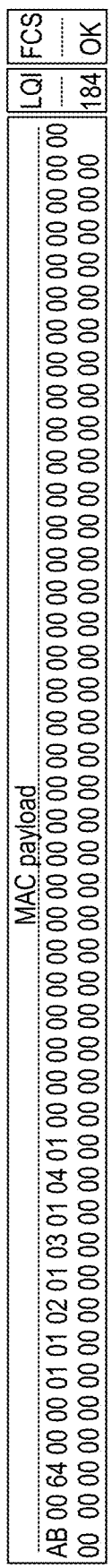
FIG. 5B depicts magnified views of the association beacon and client responses, and the MAC payload of the association beacon, both shown in FIG. 5A.

An example of such an association beacon, sent to client IDs 101, 102, 103 and 104, and the four resultant client responses, is depicted in FIG. 5A. A magnified view (for easier viewing) of both the association beacon and the client responses are shown in FIG. 5B (upper image), and a magnified view of just the payload of the association beacon sent by the new gateway (lower image). It is noted that the "MAC Payload" refers to a Media Access Control address, a hardware address that uniquely identifies each node of a network. In IEEE 802 networks, the Data Link Control (DLC) layer of the OSI Reference Model is divided into two sub-layers: the Logical Link Control (LLC) layer and the Media Access Control (MAC) layer. The MAC layer interfaces directly with the network medium.

It is further noted that although, in embodiments, the new gateway sends out this association beacon, in the example messaging of FIGS. 5A and 5B the Source Address states "0x0201" which is actually the source address of the current gateway. The images of FIG. 5A were created to capture the protocol, and thus not specifically the actual process. As noted, in embodiments, the association beacon of FIG. 5A may be sent by the new gateway.

At block 230 the current gateway may send the new gateway ID and a new channel ID to the transferred nodes. A new channel ID is crucial to avoid interference from two gateways in close proximity communicating on the same channel. Therefore to make it reliable, same channels are avoided on two gateways involved in custody transfer.

In embodiments, this may also be done via a beaconing mechanism, such as, for example, the following beacon which may be sent during custody handoff of certain packages/sensor clients from one gateway to the other, typically at way points.

GW and CH change beacon—bit map of specific clients:
AC→CONFIG_BEACON_HEADER_BYTE
0x00→6 bits reserved, 1 bit Calibrate, 1 bit NACK [no calibrate and no NACK in this example]
0x01→applies the config change to specific clients
0x01 0x02→201—Server ID (source)
0x10 0x00 0x00 0x00 0x00 0x00 0x00→Bit map for TDM slot [in this case it is client ID 0x104]
0x05→5 bytes of data to follow
0x01→CONFIG TYPE GATEWAYID CHANNEL ID
0x05 0x02→new server/GW ID 205
0x11→new channel ID=0x11
0x05→counter for custody change beacon [starts at 5 and will count down to 1]

An example of such an association beacon is depicted in FIG. 6.

Continuing with reference to FIG. 2, process 200 may move from block 230 to block 240, where the current gateway may receive an acknowledgement from one or more (in optimal conditions, all) of the transferred nodes to which it signaled in block 230.

It is noted that, in embodiments, if one or more of the transferred nodes does not acknowledge the current gateway's communication at block 230, that gateway may raise an alarm, known as a logical alarm. This is shown at block 250, shown in dashed line to indicate that this only occurs in cases where a node to be transferred does not acknowledge the communication at block 230.

Thus, in embodiments: (a) the current, or "old" gateway may transmit to the new gateway the information related to the expected clients that will now join the new gateway. This may be done via the cloud, or via a gateway-to-gateway ad-hoc communication on a management channel, such as is described above in connection with block 220; (b) the nodes themselves are communicated with using, for example, embedded information in a beacon, and informed that they are to transfer to the new gateway. However, it is possible that clients may be faulty (for any number of reasons). In such case, the old gateway is not going to get an acknowledgement from the node (to its communication at block 230), while at the same time the new gateway is waiting for the node to connect (because of condition (a) above, the communication at block 220). As the node(s) does(do) not respond, the old gateway, using a gateway-to-gateway management channel may communicate that a specific node is not operational and raise the alarm.

Process flow may terminate at block 240, if all nodes acknowledge, or, if one or more do not acknowledge, at block 250.

Figure 3:
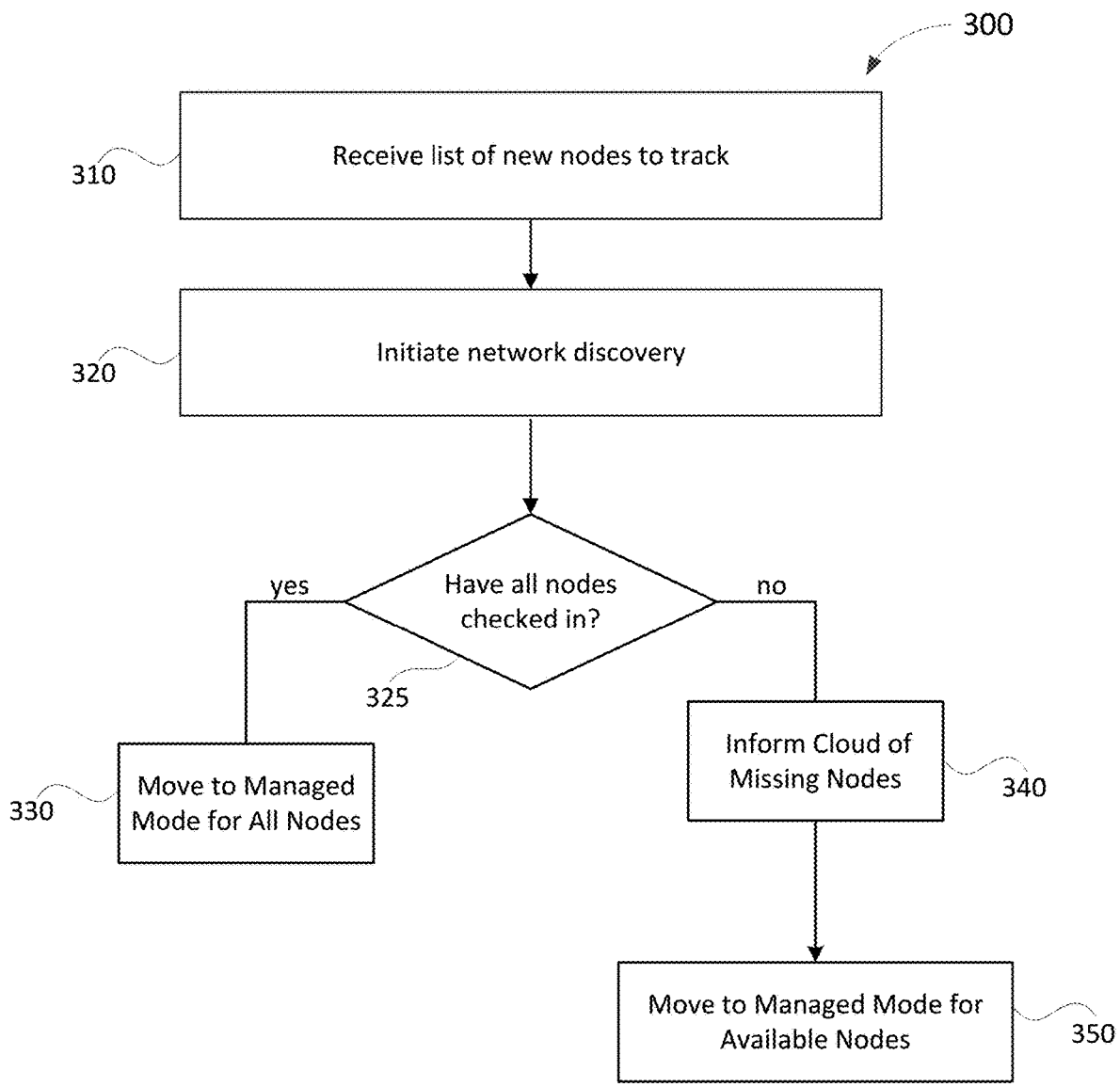
FIG. 3 illustrates an example process flow for a new gateway having received a new set of nodes, in accordance with various embodiments.

Referring now to FIG. 3, an overview of operational flow for a process at a new gateway following a transfer of custody from a previous gateway is illustrated. As illustrated, process 300 may include operations performed at blocks 310-350. The operations at blocks 310-350 may be performed by the various elements of apparatus 120-1 (the New Gateway), described earlier with reference to FIG. 1.

It is noted that by performing the processes shown in FIGS. 2 and 3, a seamless provisioning data hand-off of sensor nodes over the wireless protocol while still in transit may be performed. In embodiments, this allows for a smooth and elegant technique for custody transfers requiring minimal to no manual intervention.

Process 300 may begin at block 310. At block 310 a new gateway may receive a list of new nodes to track. In embodiments, the list may be provided by the current gateway, as noted in connection with block 210 of FIG. 2. As noted above, alternatively, the new gateway may receive the list directly from the cloud, such as from Cloud Asset Tracking Server 140, in FIG. 1.

At block 320 the new gateway may initiate network discovery. The new gateway, upon receiving the new list of sensors/nodes that it needs to track (from the current gateway, or alternatively, the cloud, as noted above), may initiate a network discovery/reconfiguration to ensure that all nodes, both existing and new, are accounted for. In embodiments, this may change the network structure based on proximity to all the nodes.

At block 325 the new gateway may query whether all nodes assigned to it for monitoring have checked in. If "Yes" at 325, i.e. all the nodes check in to the GW during this discovery phase, then process 300 may move to block 330, where the new gateway moves to managed mode for all nodes.

However, if at 325 the answer is "No", i.e., certain nodes do not check in within a stipulated time, process flow may move to block 340, and the new gateway may inform the cloud of the missing nodes to prompt manual intervention, such as a worker trying to find the nodes assigned to the new gateway that have not responded to the new gateways network discovery signal. Following such notification, process 300 may move into a managed mode for those nodes that have responded to the network discovery signal, i.e., the available nodes that are tracked and accounted for. This ensures that there is no loss of data or node visibility at the cloud level.

In embodiments, gateway to gateway communication allows for custody transfers to be managed at an edge device rather than relying on the cloud. Thus, at times when the cloud is inaccessible, gateway to gateway communication can confirm proper package handoffs between gateways and even alarm other gateways of certain nodes that have been possibly stranded during the custody transfer due to proximity issues or maybe lost due to a battery issue. This allows for quick corrective actions on the field and can call for manual intervention if at all necessary. In embodiments, this may be implemented using a gateway to gateway communications protocol, which may be based on IEEE 802.15.4 or any other wireless technology.

Given that, in embodiments, transfer of custody may be performed solely by the relevant gateways themselves, in embodiments, each gateway may implement orphan node detection. This is illustrated by process 400 in FIG. 4, next described.

As illustrated, process 400 may include operations performed at blocks 410-430. The operations at blocks 410-430 may be performed by the various elements of apparatus 120 (the Current Gateway), or of apparatus 120-1 (the New Gateway), described earlier with reference to FIG. 1.

Process 400 may begin at block 410. At block 410 a gateway may scan through all 802.15.4 channels during its down time for a small duration after it has finished managing its own network. Following such scanning, process flow may move to block 415, where it may be determined if any SOS pings were received from any nodes. Of course, such nodes would not be assigned to the gateway performing process 400. The scan operation detects any SOS pings from a "lost" node that has been disconnected from its original network for an extended duration.

To facilitate the utility of process 400, in embodiments, a client being lost (i.e., one that missed synchronizing beacons from a gateway to which it was assigned for a certain time) may prompt the client to send an SOS on a specific channel which can be received by the various gateways during their routine scans.

From block 410 process 400 may move to block 415, where it may be queried if any SOS pings were found or received. If "Yes" at block 415, process flow may move to block 425, where it may be queried if the sensor tag is authentic. If "Yes" at 425, then process flow may move to block 430, where the gateway may communicate the missing sensor tag to the cloud.

On the other hand, if "No" at 415, then process 400 may return to block 410, where the process may begin again at the next available interval. Similarly, if "No" at block 425, process 400 may return to block 410, where the process may begin again at the next available interval. Thus, in embodiments, once an abandoned node is found by an arbitrary gateway, the cloud is notified and corrective action is taken to track that orphaned package. Thus, in embodiments, there is a fail-safe, or backup process for insuring that following a change of custody transfer, checks are made for any nodes that somehow may slip through the cracks.

Figure 7:
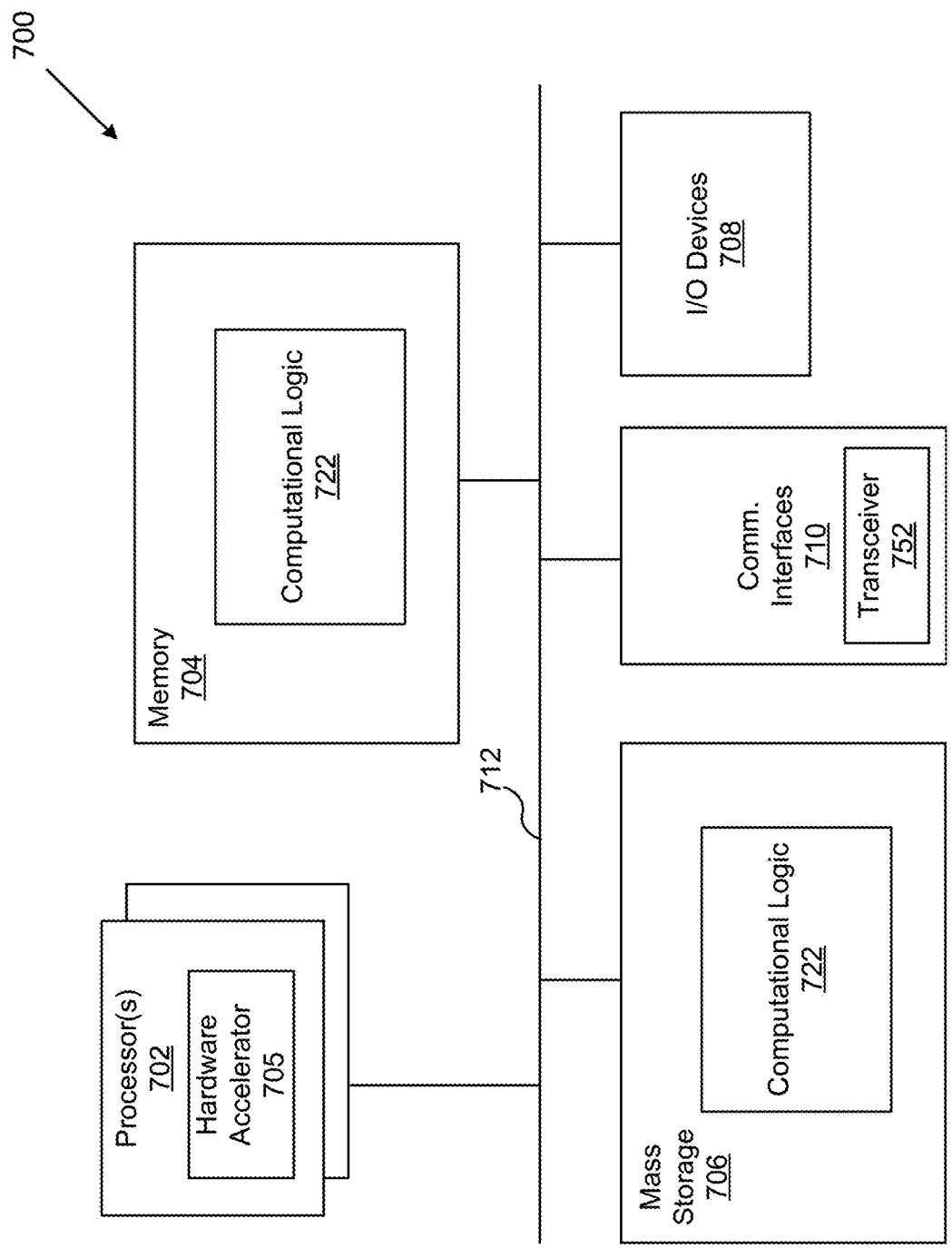
FIG. 7 illustrates a block diagram of a computer device suitable for practicing the present disclosure, in accordance with various embodiments.

Referring now to FIG. 7, wherein a block diagram of a computer device suitable for practicing the present disclosure, in accordance with various embodiments, is illustrated. Apparatus 120, 120-1, or Cloud Asset Tracking Server 140, all shown in FIG. 1, may each be implemented as such a computer device in some embodiments. As shown, computer device 700 may include one or more processors 702, memory controller 703, and system memory 704. Each processor 702 may include one or more processor cores and/or hardware accelerator 705. An example of hardware accelerator 705 may include, but is not limited to, programmed field programmable gate arrays (FPGA). Memory controller 703 may be any one of a number of memory controllers known in the art. System memory 704 may include any known volatile or non-volatile memory.

Additionally, computer device 700 may include mass storage device(s) 706 (such as solid state drives), input/output device interface 708 (to interface with various input/output devices, such as, mouse, cursor control, display device (including touch sensitive screen), and so forth) and communication interfaces 710 (such as network interface cards, modems and so forth). In embodiments, communication interfaces 710 may support wired or wireless communication, including near field communication. The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage device(s) 706 may be employed to store a working copy and a permanent copy of the executable code of the programming instructions of an operating system, one or more applications, Microcontroller Unit 121, Multiple RF Modules 123, Supporting Circuitry 127, Shipping Management Module 142, Communication Management Module 143, and/or Other 144, collectively referred to as computing logic 722. Microcontroller Unit 121, Multiple RF Modules 123, Supporting Circuitry 127, Shipping Management Module 142, Communication Management Module 143, and/or Other 144 may be configured to practice (aspects of) processes 200, 300 and 400 of FIGS. 2-4, respectively. The programming instructions may comprise assembler instructions supported by processor(s) 702 or high-level languages, such as, for example, C, that can be compiled into such instructions. In embodiments, some of computing logic may be implemented in hardware accelerator 705.

A permanent copy of the executable code of the programming instructions or the bit streams for configuring hardware accelerator 705 may be placed into permanent mass storage device(s) 706 in the factory, or in the field, through, for example, a distribution medium (not shown), such as a compact disc (CD), or through communication interface 710 (from a distribution server (not shown)).

The number, capability and/or capacity of these elements 710-712 may vary, depending on the intended use of example computer device 700.

Figure 4:
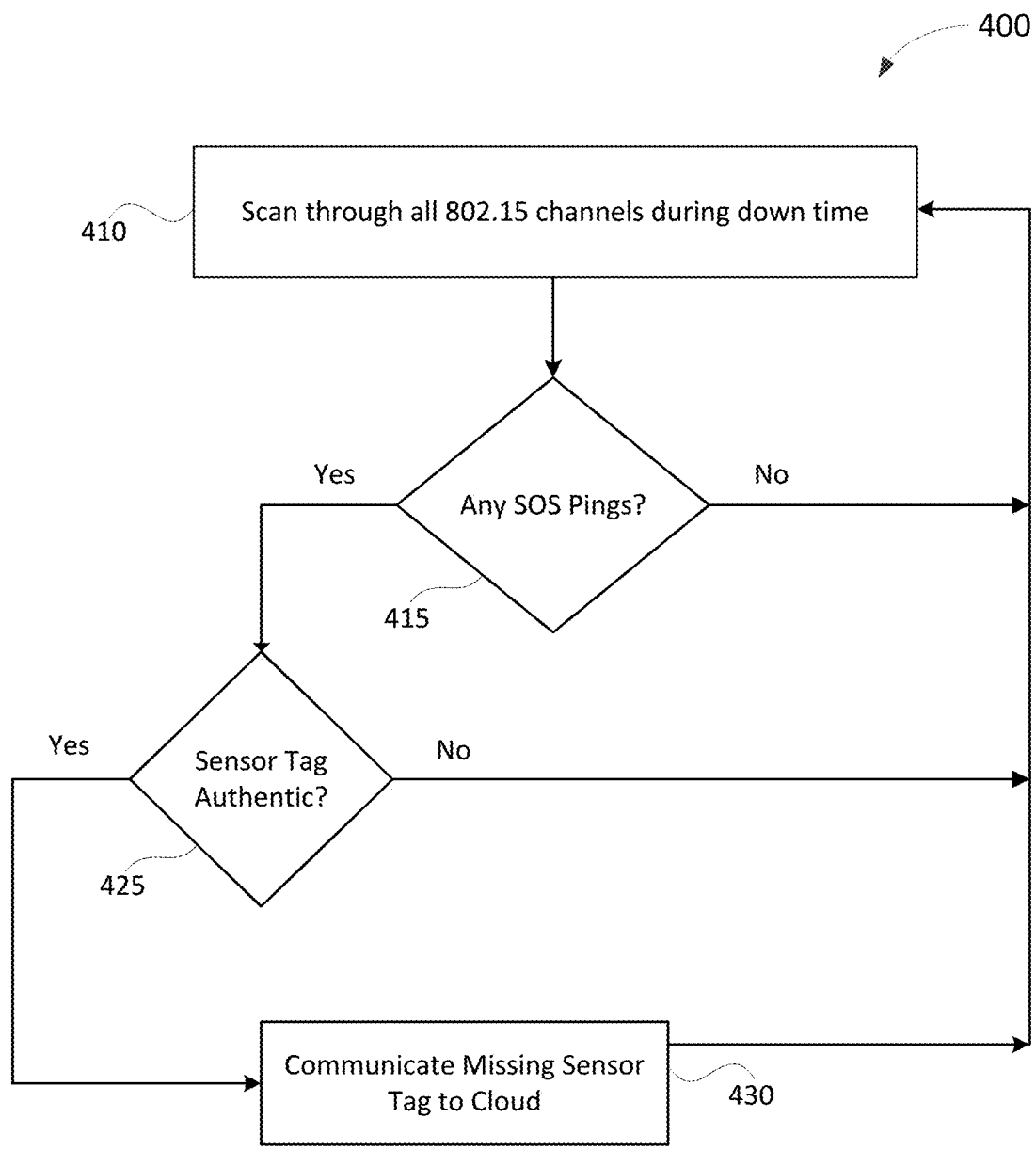
FIG. 4 illustrates an example process flow for a gateway discovering "lost" nodes, in accordance with various embodiments.
Figure 8:
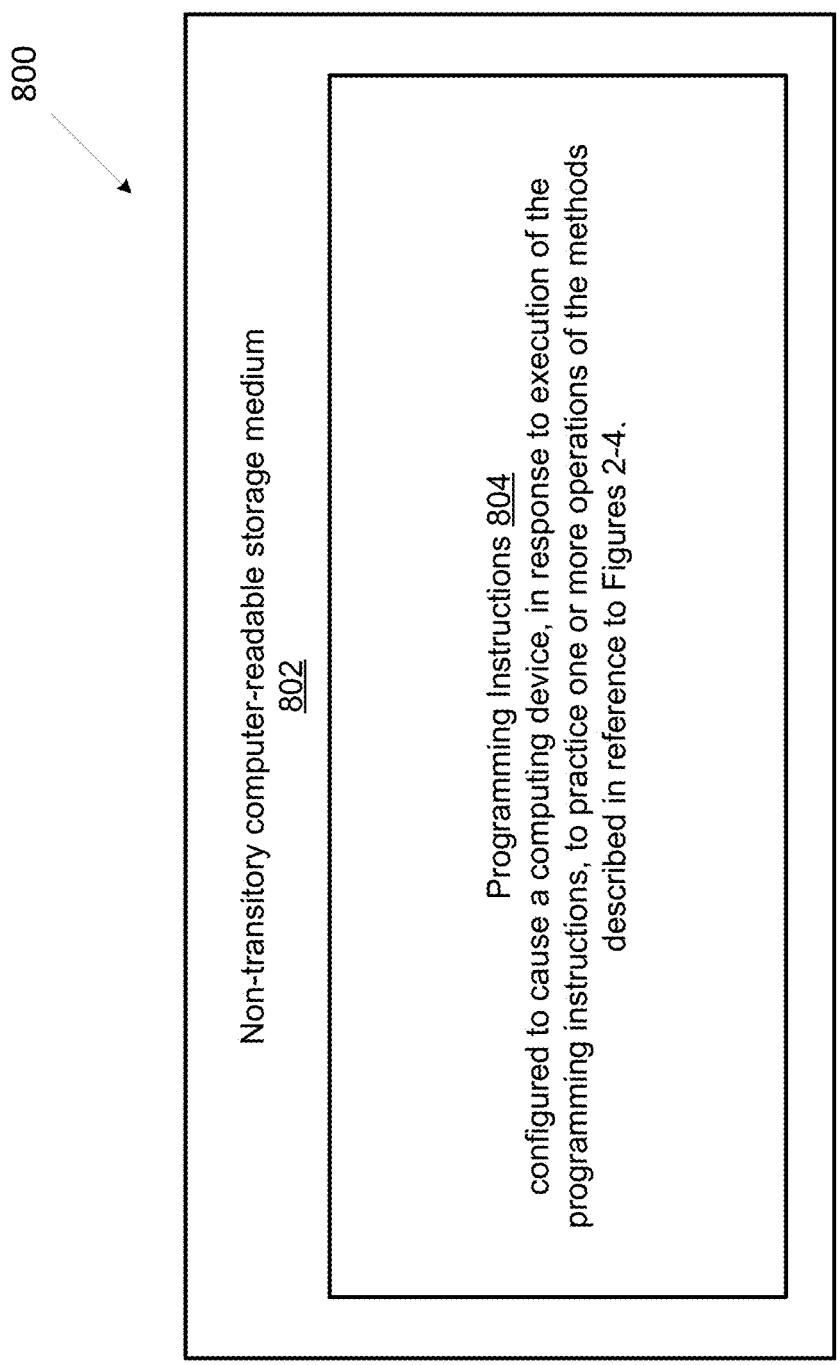
FIG. 8 illustrates an example computer-readable storage medium having instructions configured to practice aspects of the processes of FIGS. 2-4, in accordance with various embodiments.

FIG. 8 illustrates an example computer-readable storage medium having instructions configured to implement all (or portion of) Microcontroller Unit 121, Multiple RF Modules 123, Supporting Circuitry 127, Shipping Management Module 142, Communication Management Module 143 and Other 144, and/or practice (aspects of) processes 200, 300 and 400 of FIGS. 2-4, respectively, earlier described, in accordance with various embodiments. As illustrated, computer-readable storage medium 802 may include the executable code of a number of programming instructions or bit streams 804. Executable code of programming instructions (or bit streams) 804 may be configured to enable a device, e.g., computer device 800, in response to execution of the executable code/programming instructions (or operation of an encoded hardware accelerator 705), to perform (aspects of) processes 200, 300 and 400 of FIGS. 2-4, respectively. In alternate embodiments, executable code/programming instructions/bit streams 804 may be disposed on multiple non-transitory computer-readable storage medium 802 instead. In embodiments, computer-readable storage medium 802 may be non-transitory. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with references to FIGS. 2-4. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Illustrative examples of the technologies disclosed herein are provided below. An embodiment of the technologies may include any one or more, and any combination of, the examples described below.

Example 1 may include an apparatus for providing for providing transfer of custody signaling in a wireless sensor network, comprising: communications circuitry to interact with a cloud server to receive an instruction regarding a change of custody for at least one sensor node within a wireless sensor network (WSN), wherein the at least one sensor node is assigned to the apparatus for tracking and wherein the instruction identifies a second apparatus to assume custody of the at least one sensor, and a control unit coupled to the communications module to signal the second apparatus and the at least one sensor node regarding a change of custody for the at least one sensor from the apparatus to the second apparatus; wherein the signaling is over a wireless protocol of the WSN.

Example 2 may include the apparatus of example 1, or any other example herein, wherein the signaling utilizes periodic beacons that are sent from apparatuses in the WSN for time synchronization.

Example 3 may include the apparatus of example 1, or any other example herein, wherein the apparatuses in the WSN are each assigned one or more sensor nodes to track.

Example 4 may include the apparatus of any of examples 1-3, or any other example herein, wherein the sensor nodes are attached to, or packed with, packages or pallets of merchandise in transit.

Example 5 may include the apparatus of example 4, or any other example herein, wherein the transfer of custody signaling includes notifying the second apparatus to assume responsibility of tracking the at least one sensor node.

Example 6 may include the apparatus of example 4, or any other example herein, wherein the cloud server is an asset tracking system server.

Example 7 may include the apparatus of example 4, or any other example herein, wherein the transfer of custody signaling includes notifying the at least one sensor of a network identification (ID) of the second apparatus and a channel ID on which to receive beacons from the second apparatus, the channel ID being different than the channel ID used by the apparatus.

Example 8 may include the apparatus of example 4, or any other example herein, wherein the wireless protocol is based on IEEE 802.15.4.

Example 9 may include the apparatus of either of examples 1 or 8, or any other example herein, wherein the communications circuitry is to communicate in multiple radio frequency (RF) protocols, modalities or bands.

Example 10 may include the apparatus of example 9, or any other example herein, wherein the multiple RF protocols include WiFi, cellular and near-field communication (NFC).

Example 11 may include the apparatus of example 3, or any other example herein, wherein the communications module is to further receive an acknowledgement from the at least one sensor node.

Example 12 may include the apparatus of claim 11, or any other example herein, wherein if the communications module does not receive the acknowledgement as to a sensor node, the control unit signals the cloud server that that sensor node is not operational.

Example 13 may include an apparatus for providing transfer of custody signaling in a wireless sensor network, comprising: communications circuitry to interact with one of a second apparatus within the WSN or a cloud server to receive an instruction regarding a transfer of custody for at least one sensor node within a wireless sensor network (WSN), the instruction providing that the custody of the at least one sensor node is to be transferred from the second apparatus to the apparatus; and a control unit coupled to the communications circuitry to, upon receipt of the instruction, signal the at least one sensor node to allow the at least one sensor node to join the apparatus' network, wherein the signal is over a wireless protocol of the WSN.

Example 14 may include the apparatus of example 13, or any other example herein, wherein the signal to the at least one sensor is an association beacon.

Example 15 may include the apparatus of example 13, or any other example herein, wherein the cloud server is an asset tracking system server.

Example 16 may include the apparatus of any of examples 13-15, or any other example herein, wherein apparatuses in the WSN are each assigned one or more sensor nodes to track.

Example 17 may include the apparatus of example 16, or any other example herein, wherein the sensor nodes are attached to, or packed with, packages or pallets of merchandise in transit.

Example 18 may include the apparatus of example 16, or any other example herein, wherein the apparatus is to further perform network discovery following completion of the transfer of custody.

Example 19 may include the apparatus of example 18, or any other example herein, wherein completion of transfer of custody includes receiving a response from the at least one sensor nodes that were identified in the instruction.

Example 20 may include the apparatus of example 16, or any other example herein, wherein network discovery includes: sending a signal to each sensor node assigned to the custody of the apparatus; noting which sensor nodes responded; notifying the cloud server of any missing sensor nodes; and moving to managed mode for all sensor nodes that did respond.

Example 21 may include a method to be performed by a computer device providing transfer of custody signaling in a wireless sensor network (WSN), comprising: obtaining or receiving, by the computer device, from a cloud server, an instruction regarding a transfer of custody for at least one sensor node within a wireless sensor network (WSN), wherein the at least one sensor node is assigned to the computer device for tracking, and wherein the instruction identifies a second computer device within the WSN to assume custody of the at least one sensor node; and interacting, by the computer device, with the second apparatus and the at least one sensor node to provide transfer of chain of custody signaling, wherein the signaling is over a wireless protocol of the WSN.

Example 22 may include the method of example 21, or any other example herein, wherein the signaling utilizes periodic beacons that are sent from apparatuses in the WSN for time synchronization.

Example 23 may include the method of example 21, or any other example herein, wherein apparatuses in the WSN are each assigned one or more sensor nodes to track, including to periodically wirelessly communicate with the sensor nodes.

Example 24 may include the method of any one of examples 21-23, or any other example herein, wherein the sensor nodes are attached to, or packed with, packages or pallets of merchandise in transit.

Example 25 may include the method of example 24, or any other example herein, wherein the transfer of custody signaling includes notifying the second apparatus to assume responsibility of tracking the at least one sensor node.

Example 26 may include the method of example 24, or any other example herein, wherein the cloud server is an asset tracking system server.

Example 27 may include the method of example 24, or any other example herein, wherein the transfer of custody signaling includes notifying the at least one sensor of a network identification (ID) of the second apparatus and a channel ID on which to receive beacons from the second apparatus, the channel ID being different than the channel ID used by the apparatus.

Example 28 may include the method of example 24, or any other example herein, wherein the wireless protocol is based on IEEE 802.15.4.

Example 29 may include the method of example 21, or any other example herein, wherein the computer device is to further receive an acknowledgement from the at least one sensor node.

Example 30 may include the method of example 29, or any other example herein, wherein if the computer device does not receive the acknowledgement as to a sensor node, the control unit signals the cloud server that that sensor node is not operational.

Example 31 may include a method to be performed by a computer device providing transfer of custody signaling in a wireless sensor network (WSN), comprising: obtaining or receiving, by the computer device, from one of a second computer device within the WSN or a cloud server, an instruction regarding a transfer of custody for at least one sensor node within a wireless sensor network (WSN), the instruction providing that the custody of the at least one sensor node is to be transferred from the second computer device to the computer device; and interacting, by the computer device, with the at least one sensor node to signal the at least one sensor node to allow the at least one sensor node to join the apparatus' network, wherein the signal is over a wireless protocol of the WSN.

Example 32 may include the method of example 31, or any other example herein, wherein the signal to the at least one sensor is an association beacon.

Example 33 may include the method of example 31, or any other example herein, wherein the cloud server is an asset tracking system server.

Example 34 may include the method of any of examples 31-33, or any other example herein, wherein computer devices in the WSN are each assigned one or more sensor nodes to track.

Example 35 may include the method of example 34, or any other example herein, wherein the sensor nodes are attached to, or packed with, packages or pallets of merchandise in transit.

Example 36 may include the method of example 34, or any other example herein, further comprising performing network discovery following completion of the transfer of custody.

Example 37 may include the method of example 36, or any other example herein, wherein completion of transfer of custody includes receiving a response from the at least one sensor nodes that were identified in the instruction.

Example 38 may include the method of either of examples 36 or 37, or any other example herein, wherein network discovery includes: sending a signal to each sensor node assigned to the custody of the apparatus; noting which sensor nodes responded; notifying the cloud server of any missing sensor nodes; and moving to managed mode for all sensor nodes that did respond.

Example 39 may include one or more non-transitory computer-readable storage media (CRM) comprising a plurality of instructions that in response to being executed cause a computing device to: interact with a cloud server to receive an instruction regarding a transfer of custody for at least one sensor node within a wireless sensor network (WSN), wherein the at least one sensor node is assigned to the apparatus for tracking and wherein the instruction identifies a second computing device within the WSN to assume custody of the at least one sensor; and signal the second computing device and the at least one sensor node regarding the transfer of custody,
wherein the signaling is over a wireless protocol of the WSN.

Example 40 may include the one or more non-transitory computer-readable storage media of example 39, or any other example herein, wherein the signaling utilizes periodic beacons that are sent from computing devices in the WSN for time synchronization.

Example 41 may include the one or more non-transitory computer-readable storage media of example 39, or any other example herein, wherein the computing devices in the WSN are each assigned one or more sensor nodes to track.

Example 42 may include the one or more non-transitory computer-readable storage media of any of examples 39-41, or any other example herein, wherein the sensor nodes are attached to, or packed with, packages or pallets of merchandise in transit.

Example 43 may include the one or more non-transitory computer-readable storage media of example 42, or any other example herein, wherein the transfer of custody signaling includes notifying the second computing device to assume responsibility of tracking the at least one sensor node.

Example 44 may include the one or more non-transitory computer-readable storage media of example 42, or any other example herein, wherein the cloud server is an asset tracking system server.

Example 45 may include the one or more non-transitory computer-readable storage media of example 42, or any other example herein, wherein the transfer of custody signaling includes notifying the at least one sensor of a network identification (ID) of the second computing device and a channel ID on which to receive beacons from the second computing device, the channel ID being different than the channel ID used by the computing device.

Example 46 may include the one or more non-transitory computer-readable storage media of example 39, or any other example herein, wherein the wireless protocol is based on IEEE 802.15.4.

Example 47 may include the one or more non-transitory computer-readable storage media of example 39, or any other example herein, wherein the communications module is to further receive an acknowledgement from the at least one sensor node.

Example 48 may include the one or more non-transitory computer-readable storage media of example 47, or any other example herein, wherein if the computing device does not receive the acknowledgement as to a sensor node, the control unit signals the cloud server that that sensor node is not operational.

Example 49 may include one or more non-transitory computer-readable storage media (CRM) comprising a plurality of instructions that in response to being executed cause a computing device to: obtain or receive, from one of a second computing device within a WSN or a cloud server, an instruction regarding a transfer of custody for at least one sensor node within the wireless sensor network (WSN), the instruction providing that the custody of the at least one sensor node is to be transferred from the second computing device to the computing device; and interacting, by the computing device, with the at least one sensor node to signal the at least one sensor node to allow the at least one sensor node to join the computing device's network, wherein the signal is over a wireless protocol of the WSN.

Example 50 may include the one or more non-transitory computer-readable storage media of example 49, or any other example herein, wherein the signal to the at least one sensor is an association beacon.

Example 51 may include the one or more non-transitory computer-readable storage media of example 49, or any other example herein, wherein the cloud server is an asset tracking system server.

Example 52 may include the one or more non-transitory computer-readable storage media of any of examples 49-51, or any other example herein, wherein computing devices in the WSN are each assigned one or more sensor nodes to track.

Example 53 may include the one or more non-transitory computer-readable storage media of example 34, or any other example herein, wherein the sensor nodes are attached to, or packed with, packages or pallets of merchandise in transit.

Example 54 may include the one or more non-transitory computer-readable storage media of example 49, or any other example herein, further comprising performing network discovery following completion of the transfer of custody.

Example 55 may include the one or more non-transitory computer-readable storage media of example 54, or any other example herein, wherein completion of transfer of custody includes receiving a response from the at least one sensor nodes that were identified in the instruction.

Example 56 may include the one or more non-transitory computer-readable storage media of either of examples 54 or 55, or any other example herein, wherein network discovery includes: sending a signal to each sensor node assigned to the custody of the apparatus; noting which sensor nodes responded; notifying the cloud server of any missing sensor nodes; and moving to managed mode for all sensor nodes that did respond.

Example 57 may include an apparatus for computing provided in a wireless sensor network (WSN), comprising: means for interacting with a cloud server to receive an instruction regarding a transfer of custody for at least one sensor node within the WSN, wherein the at least one sensor node is assigned to the apparatus for tracking and wherein the instruction identifies a second apparatus within the WSN to assume custody of the at least one sensor; and means for signaling the second apparatus and the at least one sensor node regarding the transfer of custody, the signaling utilizing a wireless protocol of the WSN.

What is claimed is:

1. One or more non-transitory computer-readable storage media (NTCRM) comprising instructions, wherein execution of the instructions by one or more processors of a first computer device is to cause the first computer device to:
receive, from one of a second computer device or a cloud server, a transfer instruction regarding a transfer of custody for at least one sensor node, wherein the transfer instruction indicates that the custody of the at least one sensor node is to be transferred from the second computer device to the first computer device, and the first computer device is to communicate with the at least one sensor node using a first communication protocol that is different from a second communication protocol that the second computer device uses to communicate with the at least one sensor node;
in response to receipt of the transfer instruction, signal an association beacon to the at least one sensor node to indicate the transfer of custody for at least one sensor node and including information for the at least one sensor node to join a first local network of the first computer device and a time slot designation for the at least one sensor node to respond to the association beacon, wherein the first local network is different than a second local network of the second computer device; and
receive an alive message from the at least one sensor node based on the association beacon.

2. The NTCRM of claim 1, wherein the cloud server is an asset tracking system server.

3. The NTCRM of claim 1, wherein the first and second computer devices are part of a wireless sensor network (WSN) and are each assigned one or more sensor nodes to track.

4. The NTCRM of claim 1, wherein the at least one sensor node is attached to, or packed with, at least one package or pallet of merchandise in transit.

5. The NTCRM of claim 1, wherein execution of the instructions is to cause the first computer device to: perform network discovery following completion of the transfer of custody.

6. The NTCRM of claim 5, wherein, to perform network discovery, execution of the instructions is to cause the first computer device to:
send a signal to each sensor node assigned to the custody of the computer device;
note which sensor nodes responded;
notify the cloud server of any missing sensor nodes; and
move to managed mode for all sensor nodes that did respond.

7. The NTCRM of claim 1, wherein the first computer device is to communicate with the at least one sensor node over a first channel that is different from a second channel over which the second computer device communicates with the at least one sensor node.

8. The NTCRM of claim 1, wherein execution of the instructions is to cause the first computer device to: signal the at least one sensor node using a periodic time synchronization beacon to indicate the transfer of custody for the at least one sensor node.

9. The NTCRM of claim 8, wherein the periodic time synchronization beacon is to allow the at least one sensor node to join the first local network of the first computer device, includes information for the at least one sensor node to join the first local network of the first computer device, and includes at least one time slot designation for the at least one sensor node to respectively respond to the first computer device in at least one other periodic time synchronization beacon.

10. A method to be performed by a computer device providing signaling for transfer of custody of sensor nodes in a wireless sensor network (WSN), the method comprising:
interacting, by the computer device, with one of another computer device or a cloud server to receive a transfer instruction regarding a transfer of custody for at least one sensor node, the transfer instruction providing that the custody of the at least one sensor node is to be transferred from the other computer device to the computer device, and the computer device is to communicate with the at least one sensor node over a first channel that is different from a second channel over which the other computer device communicates with the at least one sensor node;
signaling, by the computer device based on the transfer instruction, an association beacon to the at least one sensor node via a periodic time synchronization beacon of a plurality of periodic time synchronization beacons to allow the at least one sensor node to join a local network of the computer device, and the association beacon includes information for the at least one sensor node to join the local network of the computer device and a time slot designation for the at least one sensor node to respond to the computer device; and
receiving, from the at least one sensor node, signaling at the designated time slot to join the local network of the computer device so that the at least one sensor node is to be monitored or managed by the computer device.

11. The method of claim 10, wherein the cloud server is an asset tracking system server, and the transfer of custody signaling includes notifying the other computer device to assume responsibility of tracking the at least one sensor node.

12. The method of claim 10, wherein the method comprises:
notifying, by the computer device, the at least one sensor node of a network identification (ID) of the other computer device and a channel ID on which to receive beacons from the other computer device, wherein the channel ID is different than the channel ID used by the computer device.

13. The method of claim 10, wherein the method comprises:
receiving, by the computer device, an acknowledgement from the at least one sensor node; and
signaling, by the computer device, the cloud server to indicate that the sensor node is not operational when the acknowledgement is not received within a predetermined period of time.

14. The method of claim 10, wherein the method comprises:
signaling, by the computer device, the at least one sensor node using a periodic time synchronization beacon to indicate the transfer of custody for the at least one sensor node.

15. The method of claim 10, wherein the periodic time synchronization beacon allows the at least one sensor node to join a local network of the computer device, the periodic time synchronization beacon includes information for the at least one sensor node to join the local network of the computer device, and includes an indication of at least one time slot designation for the at least one sensor node to respond to the computer device in at least one other periodic time synchronization beacon.

16. One or more non-transitory computer-readable storage media (NTCRM) comprising instructions, wherein execution of the instructions by one or more processors of a sensor node is to cause the sensor node to:
join a first local wireless network of a first gateway so that the sensor node is to be monitored or managed by the first gateway, wherein the first local network operates according to a first communication protocol;
receive an association beacon from a second gateway, wherein the association beacon indicates a second gateway to which the sensor node is to be transferred for monitoring or management of the sensor node by the second gateway, wherein the association beacon is a time synchronization beacon of a plurality of periodic time synchronization beacons transmitted by the second gateway, and the association beacon includes information for the sensor node to join the second local network and a time slot designation for the sensor node to respond to the second gateway; and
cause a signal to be sent to the second gateway at the designated time slot to join a second local wireless network of the second gateway so that the sensor node is to be monitored or managed by the second gateway, wherein the second local network operates according to a second communication protocol, and the second communication protocol is different than the first communication protocol.

17. The NTCRM of claim 16, wherein the sensor node and the first and second gateways are part of a wireless sensor network (WSN).

18. The NTCRM of claim 16, wherein the sensor node is attached to, or packed with, at least one package or pallet of merchandise in transit.

19. The NTCRM of claim 16, wherein execution of the instructions is to cause the sensor node to:
cause wireless communication to take place with the first gateway over a first channel to join the first local network or to allow the first gateway to monitor or manage the sensor node; and
cause wireless communication to take place with the second gateway over a second channel different from the first channel to join the second local network or to allow the second gateway to monitor or manage the sensor node.

20. The NTCRM of claim 16, wherein execution of the instructions is to cause the sensor node to:
receive a network identity (ID) of the second gateway and a channel ID on which to receive the plurality of periodic time synchronization beacons from the second gateway, wherein the channel ID is different than a channel ID used by the first gateway.

21. The NTCRM of claim 16, wherein execution of the instructions is to cause the sensor node to: cause an acknowledgement to be sent to the second gateway.

* * * * *